United States Patent
Li

(10) Patent No.: US 9,552,059 B2
(45) Date of Patent: Jan. 24, 2017

(54) INFORMATION PROCESSING METHOD AND ELECTRONIC DEVICE

(71) Applicants: LENOVO (BEIJING) LIMITED, Beijing (CN); BEIJING LENOVO SOFTWARE LTD., Beijing (CN)

(72) Inventor: Rui Li, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 355 days.

(21) Appl. No.: 14/215,298

(22) Filed: Mar. 17, 2014

(65) Prior Publication Data

US 2014/0285430 A1    Sep. 25, 2014

(30) Foreign Application Priority Data

Mar. 25, 2013   (CN) .......................... 2013 1 0097863

(51) Int. Cl.
*G06F 3/01* (2006.01)
*G06T 19/20* (2011.01)

(52) U.S. Cl.
CPC .............. *G06F 3/011* (2013.01); *G06F 3/017* (2013.01); *G06T 19/20* (2013.01); *G06T 2219/2004* (2013.01); *G06T 2219/2016* (2013.01)

(58) Field of Classification Search
CPC .......... G06F 3/011; G06F 3/017; G06T 19/20; G06T 2219/2004; G06T 2219/2016
USPC .................................................. 345/156–183
See application file for complete search history.

(56) References Cited

U.S. PATENT DOCUMENTS

| 6,064,354 | A  | * | 5/2000 | DeLuca ............ | G02B 27/22 345/419 |
| 9,303,982 | B1 | * | 4/2016 | Ivanchenko ........ | G01B 11/22 |
| 2011/0107216 | A1 | * | 5/2011 | Bi ..................... | G06F 3/011 715/716 |
| 2013/0033483 | A1 | * | 2/2013 | Im .................... | G06F 3/0482 345/419 |
| 2013/0076735 | A1 | * | 3/2013 | Lee ................... | H04N 13/0022 345/419 |
| 2014/0347456 | A1 | * | 11/2014 | Kato ................. | G02B 27/0093 348/59 |

* cited by examiner

*Primary Examiner* — Dmitriy Bolotin

(57) ABSTRACT

The present disclosure provides an information processing method and an electronic device. The information processing method is applied in an electronic device comprising or being connected to a display unit. The method comprises: acquiring a first target object containing a first display image and a second display image different from the first display image; displaying the first display image based on a first display parameter and displaying the second display image based on a second display parameter different from the first display parameter, such that a first user using the electronic device perceives a first distance value larger than zero, the first distance value indicating a distance between a plane where a display position of the first target object is located and a plane where the display unit is located; detecting user location information corresponding to the first user; and determining a second distance value between the first user and the first target object based on the user location information. In this way, the distance between the user and the first target object as perceived by the user can be determined more accurately.

14 Claims, 3 Drawing Sheets

INFORMATION PROCESSING METHOD AND ELECTRONIC DEVICE

TECHNICAL FIELD

The present invention relates to three-dimensional (3D) display technology, and more particularly, to an information processing method and an electronic device.

BACKGROUND

With the continuous development of science and technology, electronics technologies have been developing rapidly. There are more and more types of electronic products and people are enjoying various convenience brought by technical development. Now, with various electronic devices, people can enjoy comfortable lives brought by technical development.

Further, the three-dimensional (3D) technology is currently undergoing a rapid development. A virtual icon displayed in 3D can serve as a button during operation of a display device. In such scenario, the spatial display position of the virtual icon is typically provided in front of a user. In the prior art, a number of users at the same location can be sampled and the distance between the virtual icon and the location can be determined based on estimations by these users.

During the implementation of the solutions according to the embodiments of the present application, the inventors found at least the following problem in the prior art. Conventionally, a first distance between a virtual icon and a user as perceived by the user is determined based on estimations by a plurality of users. However, there are typically some errors in the estimations by the plurality of users. Therefore, the first distance corresponding to the virtual icon cannot be determined accurately.

SUMMARY

It is an object of the present invention to provide an information processing method and an electronic device, capable of solving the technical problem in the prior art that the first distance corresponding to the virtual icon cannot be determined accurately.

According to an embodiment of the present invention, an information processing method is provided. The method is applied in an electronic device comprising or being connected to a display unit. The method comprises: acquiring a first target object containing a first display image and a second display image different from the first display image; displaying the first display image based on a first display parameter and displaying the second display image based on a second display parameter different from the first display parameter, such that a first user using the electronic device perceives a first distance value larger than zero, the first distance value indicating a distance between a plane where a display position of the first target object is located and a plane where the display unit is located; detecting user location information corresponding to the first user; and determining a second distance value between the first user and the first target object based on the user location information.

Preferably, said detecting the user location information corresponding to the first user comprises: detecting, as the user location information, a third distance value between eyes of the first user and the plane where the display unit is located.

Preferably, said determining the second distance value between the first user and the first target object based on the user location information comprises: determining a first separation value between the first display image and the second display image on the display unit; detecting a pupillary distance value of the first user; and determining the second distance value based on the third distance value, the first separation value and the pupillary distance value.

Preferably, the method further comprises, prior to said determining the first separation value between the first display image and the second display image on the display unit: obtaining a first three-dimensional (3D) model which is a 3D model of the first target image perceived by a first virtual camera and a second virtual camera that simulate the eyes of the first user; acquiring a virtual width value of the display unit using the first virtual camera and the second virtual camera; and acquiring a second separation value of the first target image using the first virtual camera and the second virtual camera.

Preferably, said determining the first separation value between the first display image and the second display image on the display unit comprises: determining an actual width value of the display unit; and determining the first separation value based on the actual width value, the virtual width value and the second separation value.

Preferably, said obtaining the second separation value of the first target image using the first virtual camera and the second virtual camera comprises: determining a fourth distance value between the first target object and a first connection line in the first 3D model, the first connection line connecting the first virtual camera and the second virtual camera; determining a fifth distance value between the first virtual camera and the second virtual camera; determining a sixth distance value between a visual focus of the first virtual camera and the second virtual camera and the first connection line; and determining the second separation value based on the fourth distance value, the fifth distance value and the sixth distance value.

Preferably, the method further comprises, subsequent to determining the second distance value between the first user and the first target object based on the user location information: obtaining a first operation performed by the first user; judging whether the first operation and the second distance value satisfy a predetermined relationship; and generating, in response to the first operation, a first control instruction corresponding to the first operation when the first operation and the second distance value satisfy the predetermined relationship.

Preferably, said judging whether the first operation and the second distance value satisfy the predetermined relationship comprises: determining a seventh distance value between a first operation area of the first operation and the first user; and judging whether an absolute difference between the seventh distance value and the second distance value is smaller than a predetermined distance threshold, wherein it is judged that the first operation and the second distance value satisfy the predetermined relationship when the absolute difference is smaller than the predetermined distance threshold.

According to another embodiment of the present invention, an electronic device is provided. The electronic device comprises or is connected to a display unit. The electronic device comprises: a first obtaining module configured to obtain a first target object containing a first display image and a second display image different from the first display image; a displaying module configured to display the first display image based on a first display parameter and display the second display image based on a second display parameter different from the first display parameter, such that a first user using the electronic device perceives a first distance value larger than zero, the first distance value indicating a distance between a plane where a display position of the first target object is located and a plane where the display unit is located; a detecting module configured to detect user location information corresponding to the first user; and a determining module configured to determine a second distance value between the first user and the first target object based on the user location information.

Preferably, the detecting module is configured to: detect, as the user location information, a third distance value between eyes of the first user and the plane where the display unit is located.

Preferably, the determining module comprises: a first determining unit configured to determine a first separation value between the first display image and the second display image on the display unit; a detecting unit configured to detect a pupillary distance value of the first user; and a second determining unit configured to determine the second distance value based on the third distance value, the first separation value and the pupillary distance value.

Preferably, the electronic device further comprises: an obtaining module configured to obtain a first three-dimensional (3D) model which is a 3D model of the first target image perceived by a first virtual camera and a second virtual camera that simulate the eyes of the first user, before determining the first separation value between the first display image and the second display image on the display unit; a second acquiring module configured to acquire a virtual width value of the display unit using the first virtual camera and the second virtual camera; and a third acquiring module configured to acquire a second separation value of the first target image using the first virtual camera and the second virtual camera.

Preferably, the first determining unit comprises: a first determining sub-unit configured to determine an actual width value of the display unit; and a second determining sub-unit configured to determine the first separation value based on the actual width value, the virtual width value and the second separation value.

Preferably, the third acquiring module comprises: a third determining unit configured to determine a fourth distance value between the first target object and a first connection line in the first 3D model, the first connection line connecting the first virtual camera and the second virtual camera; a fourth determining unit configured to determine a fifth distance value between the first virtual camera and the second virtual camera; a fifth determining unit configured to determine a sixth distance value between a visual focus of the first virtual camera and the second virtual camera and the first connection line; and a sixth determining unit configured to determine the second separation value based on the fourth distance value, the fifth distance value and the sixth distance value.

Preferably, the electronic device further comprises: a capturing module configured to obtain a first operation performed by the first user, after the determining module determines the second distance value between the first user and the first target object based on the user location information; a judging module configured to judge whether the first operation and the second distance value satisfy a predetermined relationship; and a responding module configured to generate, in response to the first operation, a first control instruction corresponding to the first operation when the first operation and the second distance value satisfy the predetermined relationship.

Preferably, the judging module comprises: a seventh determining unit configured to determine a seventh distance value between a first operation area of the first operation and the first user; and a judging unit configured to judge whether an absolute difference between the seventh distance value and the second distance value is smaller than a predetermined distance threshold, wherein it is judged that the first operation and the second distance value satisfy the predetermined relationship when the absolute difference is smaller than the predetermined distance threshold.

One or more of the above solutions according to the embodiments of the present application have at least the following technical effects or advantages:

1) In the embodiments of the present application, the second distance value between the first user and the first target object as perceived by the first user may be determined based on the user location information of the first user. Since the user location information is an accurate data, rather than an estimated data, the second distance value can be determined more accurately.

2) In the embodiments of the present application, after the second distance value is determined, the first operation performed by the first user is obtained. A first control instruction corresponding to the first operation is generated in response to the first operation when the first operation and the second distance value satisfy a predetermined relationship. Since the second distance value is determined more accurately, the first operation can be responded more accurately, thereby avoiding erroneous responses.

DETAILED DESCRIPTION OF THE EMBODIMENTS

The embodiments of the present invention provide an information processing method and an electronic device, capable of solving the technical problem in the prior art that a first distance corresponding to a virtual icon cannot be determined accurately.

In order to solve the above problem, the general concept of the solutions according to the embodiments of the present invention is as follows.

An information processing method is provided. The method is applied in an electronic device comprising or being connected to a display unit. The method comprises: acquiring a first target object containing a first display image and a second display image different from the first display image; displaying the first display image based on a first display parameter and displaying the second display image based on a second display parameter different from the first display parameter, such that a first user using the electronic device perceives a first distance value larger than zero, the first distance value indicating a distance between a plane where a display position of the first target object is located and a plane where the display unit is located; detecting user location information corresponding to the first user; and determining a second distance value between the first user and the first target object based on the user location information.

In the above solution, the second distance value between the first user and the first target object as perceived by the first user is determined based on the user location information of the first user. Since the user location information is an accurate data, rather than an estimated data, the second distance value can be determined more accurately.

In the following, the solutions of the present invention will be described in detail with reference to the figures and the embodiments. It should be noted that the embodiments of the present invention and their specific features are given for illustrating the solutions of the present invention and are not intended to limit the scope of the present invention. The embodiments of the present invention and their specific features can be combined with each other, provided that they do not conflict.

According to an embodiment of the present invention, an information processing method is provided. The method is applied in an electronic device comprising or being connected to a display unit. The electronic device can be e.g., a 3D imaging device.

Figure 1:
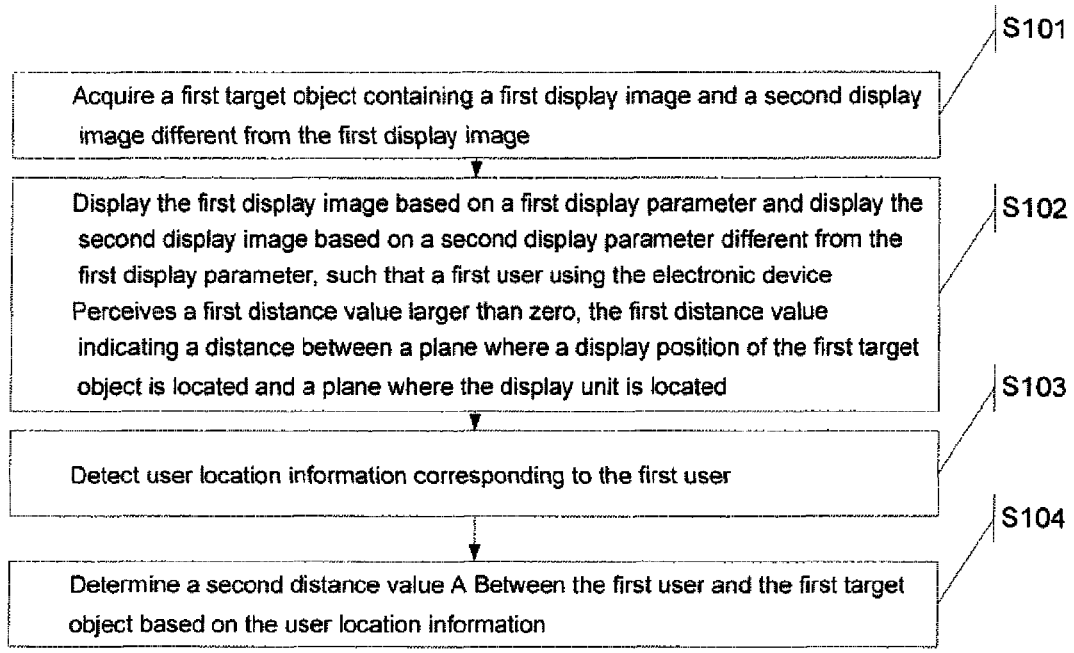
FIG. 1 is a flowchart illustrating the information processing method according to an embodiment of the present application.

Referring to FIG. 1, the information processing method includes the following steps.

At step S101, a first target object containing a first display image and a second display image different from the first display image is acquired.

At step S102, the first display image is displayed based on a first display parameter and the second display image is displayed based on a second display parameter different from the first display parameter, such that a first user using the electronic device perceives a first distance value larger than zero. The first distance value indicates a distance between a plane where a display position of the first target object is located and a plane where the display unit is located.

At step S103, user location information corresponding to the first user is detected.

At step S104, a second distance value, A, between the first user and the first target object is determined based on the user location information.

Typically, a 3D imaging device will output two different images, e.g., the first display image and the second display image. These two images will be displayed simultaneously on a display unit of the 3D imaging device. There will be a first separation value between the two images on the display unit when they are displayed. From the view point of the first user, they are combined into a first target object. The first distance value between a plane where a display position of the first target object is located and a plane where the display unit is located is larger than zero. That is, the first user perceives that the first target object is displayed as if it protrudes from the display unit. Hence, in the step S101, upon obtaining the first target object, the first display image and the second display image corresponding to the first target object can be determined.

Here, in the step S102, in order to allow the first target object composed of the first display image and the second display image to be displayed as if it protrudes from the display unit, the first and second display images need to be displayed based on different display parameters. For example, the first and second display images can be displayed at different positions on the display unit.

In the step S103, a physical camera can be provided in the environment where the electronic device is positioned. For example, the physical camera can be provided on the casing of the electronic device for detecting the user location information. The user location information can be e.g., a third distance value, b, between eyes of the first user and the electronic device.

Here, the step S104 for determining the second distance value, A, between the first user and the first target object based on the user location information can include the following steps of: determining a first separation value, D, between the first display image and the second display image on the display unit; detecting a pupillary distance value, a, of the first user; and determining the second distance value A based on the third distance value b, the first separation value D and the pupillary distance value a.

Figure 2:
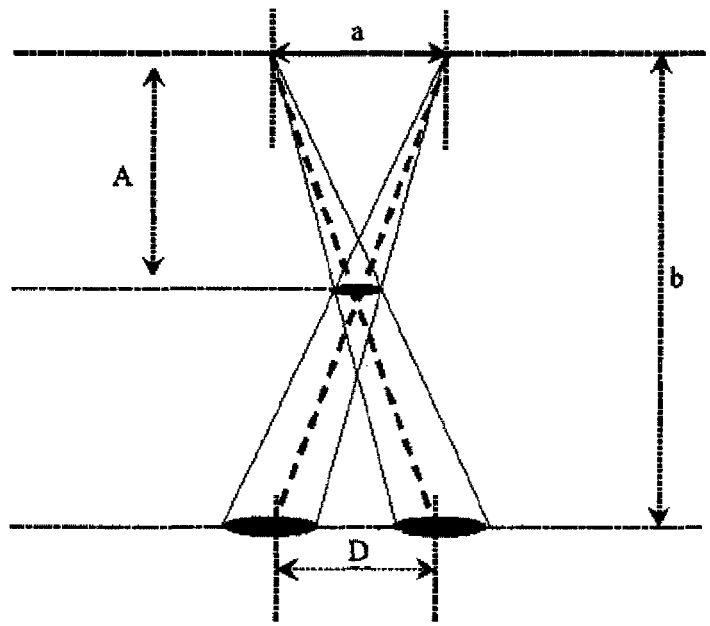
FIG. 2 is a schematic diagram showing the positional relationship among the pupillary distance value, the third distance value, the first separation value and the second distance value in the information processing method according to an embodiment of the present application.

FIG. 2 is a schematic diagram showing the positional relationship among the pupillary distance value a, the third distance value b, the first separation value D and the second distance value A. It can be seen from FIG. 2 that the pupillary distance value a, the third distance value b, the first separation value D and the second distance value A correspond to two similar triangles, respectively. Therefore, the following equation can be determined for the similar triangles:

$$a/D = A/(b-A) \quad [1]$$

In turn, the second distance value A can be determined based on the following equation:

$$A = a*b/(a+D) \quad [2]$$

In an embodiment, the pupillary distance value a and the third distance value b can be captured by using a physical camera provided on the surface of the 3D imaging device. That is, the second distance value A can be determined once the first separation value D is known.

In an embodiment, the following steps can be performed prior to determining the first separation value D.

A first three-dimensional (3D) model is obtained, which is a 3D model of the first target image perceived by a first virtual camera and a second virtual camera that simulate the eyes of the first user. A virtual width value, k, of the display unit is acquired using the first virtual camera and the second virtual camera. A second separation value, d, of the first target image is acquired using the first virtual camera and the second virtual camera.

In particular, in order to establish a 3D model for the 3D scenario where the first target object is located, a first virtual camera and a second virtual camera are provided in the 3D scenario for capturing images actually perceived by the left and right eyes of the first user, respectively. Here, the virtual width value k of the 3D imaging device can be captured by the first and second virtual cameras. Then, the second separation value d can be determined using the first and second virtual cameras.

In an embodiment, the second separation value d can be determined by: determining a fourth distance value, y, between the first target object and a first connection line in the first 3D model, the first connection line connecting the first virtual camera and the second virtual camera; determining a fifth distance value, β, between the first virtual camera and the second virtual camera; determining a sixth distance value, x, between a visual focus of the first virtual camera and the second virtual camera and the first connection line; and determining the second separation value d based on the fourth distance value y, the fifth distance value β and the sixth distance value x.

Figure 3:
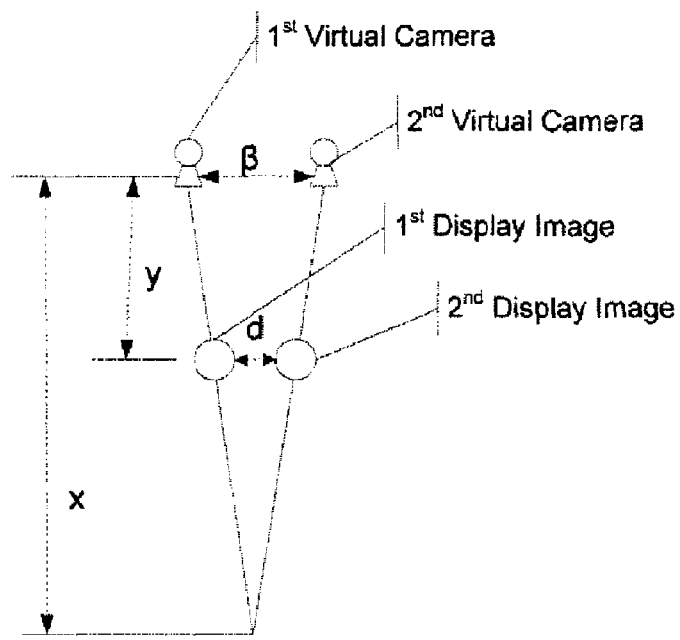
FIG. 3 is a schematic diagram showing the positional relationship among the fourth distance value, the fifth distance value, the sixth distance value and the second separation value in the information processing method according to an embodiment of the present application.

Here, the fourth distance value y, the fifth distance value β and the sixth distance value x can all be obtained directly from parameter information of the 3D scenario. It can be seen from FIG. 3 that the fourth distance value y, the fifth distance value β and the sixth distance value x and the second separation value d correspond to two similar triangles, respectively. Therefore, the following equation can be determined for the similar triangles:

$$d/\beta=(x-y)/x \quad [3]$$

In turn, the second separation value d can be determined based on the following equation:

$$d=\beta*(x-y)/x \quad [4]$$

After obtaining the virtual width value k and the second separation value d, the first separation value D can be obtained by: determining an actual width value, K, of the display unit; and determining the first separation value D based on the actual width value K, the virtual width value k and the second separation value d.

In an embodiment, the actual width value K of the display unit can be determined based on parameters of the screen of the 3D imaging device. A ratio of the virtual width value k of the display unit as captured by the first and second virtual cameras to the actual width value K is referred to as a first ratio. A ratio of the second separation value d as captured by the first and second virtual cameras to the first separation value D is referred to a second ratio. Here, since the first ratio equals to the second ratio, the following equation can be determined:

$$k/K=d/D \quad [5]$$

Therefore, the first separation value D can be obtained using the following equation:

$$D=K*d/k \quad [6]$$

Then, the first separation value D can be determined by substituting Equation [4] into Equation [6]:

$$D=K*\beta*(x-y)/(x*k) \quad [7]$$

Then, the second distance value A can be obtained using the following equation, by substituting Equation [7] into Equation [2]:

$$A=a*b/[a+K*\beta*(x-y)/(x*k)] \quad [8]$$

In the above Equation [8], x, y, β and k can all be acquired from the parameters of the 3D scenario; K can be acquired from the parameters of the 3D imaging device; and a and b can be acquired by using the physical camera. Therefore, the second distance value A can be obtained directly using the above equation.

Figure 4:
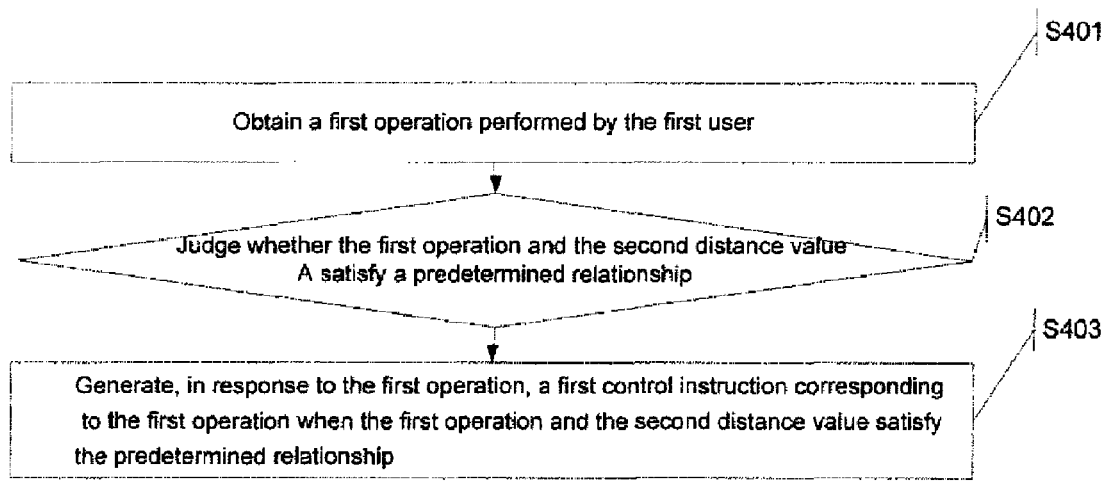
FIG. 4 is a flowchart illustrating a process for generating the first control instruction in the information processing method according to an embodiment of the present application.

In an embodiment, the following steps can be performed after the second distance value A is determined in the step S104, as shown in FIG. 4.

At step S401, a first operation performed by the first user is obtained.

At step S402, it is judged whether the first operation and the second distance value A satisfy a predetermined relationship.

At step S403, a first control instruction corresponding to the first operation is generated in response to the first operation when the first operation and the second distance value A satisfy the predetermined relationship.

Here, in the step S401, the first operation can be detected by a physical camera provided on the surface of the 3D imaging device. The first operation can be e.g., a clicking operation in the air or a sliding operation in the air. The present application is not limited to any specific type of the first operation.

In the step S402, the predetermined relationship can be any relationship. Thus, the judgment is not limited to any specific relationship. Two examples will be given below. However, the present application is not limited to these examples.

In the first example, the step of judging whether the first operation and the second distance value A satisfy the predetermined relationship includes: determining a seventh distance value between a first operation area of the first operation and the first user; and judging whether an absolute difference between the seventh distance value and the second distance value is smaller than a predetermined distance threshold. It is judged that the first operation and the second distance value A satisfy the predetermined relationship when the absolute difference is smaller than the predetermined distance threshold.

In an embodiment, the first target object can be a virtual button and the purpose of the first operation performed by the user is to operate the virtual button. Thus, the absolute difference between the seventh distance value and the second distance value A is smaller than a predetermined distance threshold. Here, when the first operation corresponds to a large area, the predetermined relationship can be satisfied if: the absolute difference between i) the seventh distance value between any point in the first operation area and the first user, and ii) the second distance value A, is smaller than the predetermined distance threshold; the absolute difference between i) the seventh distance value between each point in the first operation area and the first user, and ii) the second distance value A, is smaller than the predetermined distance threshold; or the absolute difference between i) the seventh distance value between a first operation sub-area in the first operation area that overlaps the first target object and the first user, and ii) the second distance value A, is smaller than the predetermined distance threshold. The present application is not limited to any of the above relationships.

In an embodiment, the seventh distance value may be larger or smaller than the second distance value A. Therefore, the absolute difference between the seventh distance value and the second distance value A is used. That is, regardless of whether the seventh distance value is larger or smaller than the second distance value A, the first operation satisfies the first predetermined relationship as long as the first operation area is positioned within a predetermined range on the plane where the first target object perceived by the first user is located.

Here, the absolute difference can be any value. As a preferred embodiment, the absolute difference can be 0. However, since the operation is performed in the air, typically the absolute difference will not be 0 precisely. It will be sufficient if the absolute difference does not deviate from 0 significantly.

In the second example, the step of judging whether the first operation and the second distance value A satisfy the predetermined relationship includes: determining a first gesture corresponding to the first operation; and judging whether the first gesture satisfies a second predetermined relationship with the second distance value A.

In an embodiment, the first gesture can be any gesture, such as a waving gesture or a gesture for drawing a straight line.

Here, the second predetermined relationship to be satisfied between the first gesture and the second distance value A can be any of various relationships. For example, the difference between each of a number of points in the first gesture and the second distance value A can be larger than a preset value while the difference between any other point in the first gesture and the second distance value A can be smaller than the preset value. Alternatively, the difference between each point in the first gesture and the second distance value A can be smaller than the preset value. The present application is not limited to any specific second predetermined relationship.

In the step S403, a correspondence between a number of operations and a number of control instructions can be stored in the 3D imaging device. Once it is determined that the first operation satisfies the first predetermined condition, the first control instruction corresponding to the first operation can be determined based on the correspondence. Then, the first control instruction can be executed to perform a first function corresponding to the first operation.

In an embodiment, after capturing the first operation, the electronic device stores the first operation and acquires the second distance value A. After the second distance value A is acquired, the first operation is acquired from a memory of the electronic device. Then, it is judged whether the first operation and the second distance value A satisfy the predetermined relationship. Alternatively, the second distance value A can be stored in advance. Once the first operation is captured, the second distance value A can be directly read from the memory of the electronic device. Then, it is judged whether the first operation and the second distance value A satisfy the predetermined relationship. The present application is not limited thereto.

It can be seen from above that, in the embodiments of the present application, after the second distance value is determined, the first operation performed by the first user is obtained. A first control instruction corresponding to the first operation is generated in response to the first operation when the first operation and the second distance value satisfy a predetermined relationship. Since the second distance value is determined more accurately, the first operation can be responded more accurately, thereby avoiding erroneous responses.

In the following, the information processing method according to the embodiment of the present application will be explained with reference to some particular application environments. It is to be noted that the embodiments are illustrative only and cannot limit the present invention. All the embodiments that follow the inventive concept are to be encompassed by the scope of the present invention. Variants can be made by those skilled in the art according to the inventive concept.

EXAMPLE 1

In this example, the electronic device is a 3D TV, the first user is User A and the user location information indicates a third distance value b between the eyes of User A and the 3D TV. Here, a physical camera is provided on the casing of the 3D TV.

At time T1, User A is watching a 3D movie on the 3D TV. Here, in addition to the video file corresponding to the 3D movie, a number of buttons for controlling the video file are displayed on the display unit of the 3D TV. In the following, assuming a button as a Fast Forward (FF) button, the process for detecting a second distance value A1 between the FF button and User A as perceived by User A will be explained.

While User A is watching the 3D movie, the 3D TV detects the third distance value b1 between User A and the 3D TV and the pupillary distance value a1 of User A, by using the physical camera provided on the casing of the 3D TV. The 3D TV reads the actual width value K1 of the 3D TV from its parameter information. Further, the 3D TV determines the sixth distance value x1, the fourth distance value y1 and the fifth distance value β1 from the 3D modeling scenario of the 3D movie. Then, based on the above Equation [8], the second distance value A1 between the pause button and User A as perceived by User A can be determined as follows:

$$A1=a1*b1/[a1+K1*\beta 1*(x1-y1)/(x1*k1)] \quad [9]$$

The 3D TV can determine the distance value between each of the other buttons and User A as perceived by User A in the same way. Then, the 3D TV stores the distance values between the buttons and User A as perceived by User A in its memory.

At time T2, User A performs a pause operation that clicks the pause button in the air. Upon detecting the pause operation, the camera of the 3D TV determines the distance A2 between the pause operation and the TV.

Then, the 3D TV reads from its memory the second distance value A1 between User A and the pause button, calculates the absolute value of the difference between A1 and A2 and then determines that the absolute value is smaller than a preset distance threshold. Thus, the 3D TV determines that a predetermined relationship is satisfied between the pause operation and the second distance value A1. Therefore, the 3D TV controls the 3D movie to enter a pause state in response to the pause operation.

At time T3, User A performs a turn-off operation that clicks an off button of the player in the air. Upon capturing the turn-off operation, the camera of the 3D TV determines the distance A3 between the second operation and the 3D TV. Then, the 3D TV reads from its memory the second distance value A3 between User A and the off button, calculates the absolute value of the difference between A1 and A3 and then determines that the absolute value is larger than the preset distance threshold. Thus, the 3D TV determines that a predetermined relationship is not satisfied between the turn-off operation and the second distance value A1. Therefore, the 3D TV does not respond to the turn-off operation.

EXAMPLE 2

In this example, the electronic device is a 3D TV, the first user is User B and the user location information indicates a third distance value between the eyes of User A and the 3D TV. There is a physical camera having a data connection with the 3D TV in the environment where the 3D TV is positioned.

At time T4, User B turns on the 3D TV for playing a 3D movie. Here, the 3D movie is played by a player. User B perceives the video file of the 3D movie and the player playing the 3D movie as if they protrude from the display unit of the 3D TV.

At time T5, User B performs an FF operation that clicks an FF button on the player. Upon detecting the FF operation, the physical camera forwards the FF operation to the 3D TV. Upon receiving the FF operation, the 3D TV controls the physical camera to detect the third distance value b2 and the pupillary distance value a2 of User B. Then the 3D TV reads the actual width value K2 of the 3D TV from its parameter information. Further, the 3D TV determines the sixth distance value x2, the fourth distance value y2 and the fifth distance value β2 from the 3D modeling scenario of the 3D movie. Then, based on the above Equation [8], the second distance value A4 between the FF button and User B as perceived by User B can be determined as follows:

$$A4=a2*b2/[a2+K2*\beta2*(x2-y2)/(x2*k2)] \quad [10]$$

At the same time, the 3D TV determines the seventh distance value A5 corresponding to the FF operation based on the FF operation detected by the camera, calculates the absolute value of the difference between the seventh distance value A5 and the second distance value A4 and then determines that the absolute value is smaller than a preset distance threshold. Thus, the 3D TV determines that a predetermined relationship is satisfied between the FF operation and the second distance value A4. Therefore, the 3D TV controls the 3D movie to forward fast in response to the FF operation.

Figure 5:
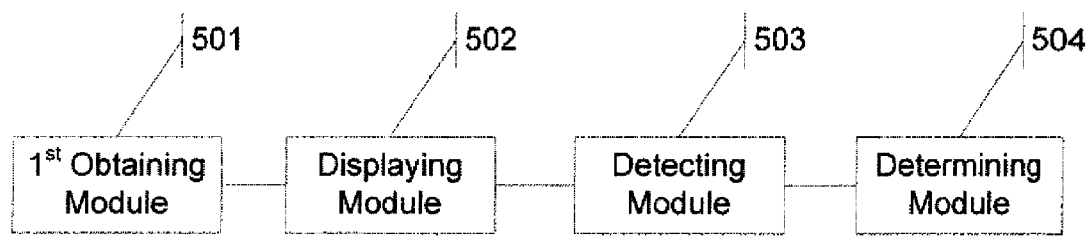
FIG. 5 is a schematic diagram showing the structure of the electronic device according to an embodiment of the present invention.

According to another embodiment of the present invention, an electronic device corresponding to the above information processing method is provided. The electronic device comprises or is connected to a display unit. As shown in FIG. 5, the electronic device comprises the following modules.

A first obtaining module 501 is configured to obtain a first target object containing a first display image and a second display image different from the first display image.

A displaying module 502 is configured to display the first display image based on a first display parameter and display the second display image based on a second display parameter different from the first display parameter, such that a first user using the electronic device perceives a first distance value larger than zero, the first distance value indicating a distance between a plane where a display position of the first target object is located and a plane where the display unit is located.

A detecting module 503 is configured to detect user location information corresponding to the first user.

A determining module 504 is configured to determine a second distance value A between the first user and the first target object based on the user location information.

In an embodiment, the detecting module 503 is configured to: detect, as the user location information, a third distance value b between eyes of the first user and the plane where the display unit is located.

In an embodiment, the determining module 504 comprises: a first determining unit configured to determine a first separation value D between the first display image and the second display image on the display unit; a detecting unit configured to detect a pupillary distance value a of the first user; and a second determining unit configured to determine the second distance value A based on the third distance value b, the first separation value D and the pupillary distance value a.

In an embodiment, the electronic device further comprises: an obtaining module configured to obtain a first three-dimensional (3D) model which is a 3D model of the first target image perceived by a first virtual camera and a second virtual camera that simulate the eyes of the first user, before determining the first separation value D between the first display image and the second display image on the display unit; a second acquiring module configured to acquire a virtual width value k of the display unit using the first virtual camera and the second virtual camera; and a third acquiring module configured to acquire a second separation value d of the first target image using the first virtual camera and the second virtual camera.

In an embodiment, the first determining unit comprises: a first determining sub-unit configured to determine an actual width value K of the display unit; and a second determining sub-unit configured to determine the first separation value D based on the actual width value K, the virtual width value k and the second separation value d.

In an embodiment, the third acquiring module comprises: a third determining unit configured to determine a fourth distance value y between the first target object and a first connection line in the first 3D model, the first connection line connecting the first virtual camera and the second virtual camera; a fourth determining unit configured to determine a fifth distance value β between the first virtual camera and the second virtual camera; a fifth determining unit configured to determine a sixth distance value x between a visual focus of the first virtual camera and the second virtual camera and the first connection line; and a sixth determining unit configured to determine the second separation value d based on the fourth distance value y, the fifth distance value β and the sixth distance value x.

In an embodiment, the electronic device further comprises: a capturing module configured to obtain a first operation performed by the first user, after the determining module determines the second distance value A between the first user and the first target object based on the user location information; a judging module configured to judge whether the first operation and the second distance value A satisfy a predetermined relationship; and a responding module configured to generate, in response to the first operation, a first control instruction corresponding to the first operation when the first operation and the second distance value A satisfy the predetermined relationship.

In an embodiment, the judging module comprises: a seventh determining unit configured to determine a seventh distance value between a first operation area of the first operation and the first user; and a judging unit configured to judge whether an absolute difference between the seventh distance value and the second distance value A is smaller than a predetermined distance threshold, wherein it is judged that the first operation and the second distance value A satisfy the predetermined relationship when the absolute difference is smaller than the predetermined distance threshold.

The above electronic device is the electronic device used in the information processing method according to the present application. Thus, the structure and variants of the electronic device can be appreciated by those skilled in the art based on the information processing method according to the embodiment of the present invention as described above. Therefore, the details of the electronic device will be omitted here. The electronic device used in the information processing method according to the embodiment of the present application is to be encompassed by the scope of the present application.

One or more of the above solutions according to the embodiments of the present application have at least the following effects or advantages:

1) In the embodiments of the present application, the second distance value between the first user and the first target object as perceived by the first user is determined based on the user location information of the first user. Since the user location information is an accurate data, rather than an estimated data, the second distance value can be determined more accurately.

2) In the embodiments of the present application, after the second distance value is determined, the first operation performed by the first user is obtained. A first control instruction corresponding to the first operation is generated in response to the first operation when the first operation and the second distance value satisfy a predetermined relationship. Since the second distance value is determined more accurately, the first operation can be responded more accurately, thereby avoiding erroneous responses.

While the preferred embodiments of the present application have been described above, various modifications and alternatives to these embodiments can be made by those skilled in the art based on the fundamental inventive concept. Therefore, these preferred embodiments and all the modifications and alternatives falling within the scope of the present application are to be encompassed by the claims as attached.

Obviously, various modifications and alternatives can be made to the present application by those skilled in the art without departing from the spirit and scope of the present application. Therefore, these modifications and alternatives are to be encompassed by the present application if they fall within the scope of the claims and their equivalents.

What is claimed is:

1. An information processing method applied in an electronic device, the electronic device comprising or being connected to a display unit, the method comprising:
   acquiring a first target object containing a first display image and a second display image different from the first display image;
   displaying the first display image based on a first display parameter and displaying the second display image based on a second display parameter different from the first display parameter, such that a first user using the electronic device perceives a first distance value larger than zero, the first distance value indicating a distance between a plane where a display position of the first target object is located and a plane where the display unit is located;
   detecting user location information corresponding to the first user;
   obtaining a first three-dimensional (3D) model which is a 3D model of the first target object perceived by a first virtual camera and a second virtual camera that simulate the eyes of the first user:
   acquiring a virtual width value of the display unit using the first virtual camera and the second virtual camera;
   acquiring a second separation value of the first target object using the first virtual camera and the second virtual camera; and
   determining a second distance value between the first user and the first target object based on the user location information.

2. The method of claim 1, wherein said detecting the user location information corresponding to the first user comprises:
   detecting, as the user location information, a third distance value between eyes of the first user and the plane where the display unit is located.

3. The method of claim 2, wherein said determining the second distance value between the first user and the first target object based on the user location information comprises:
   determining a first separation value between the first display image and the second display image on the display unit;
   detecting a pupillary distance value of the first user; and
   determining the second distance value based on the third distance value, the first separation value and the pupillary distance value.

4. The method of claim 1, wherein said determining the first separation value between the first display image and the second display image on the display unit comprises:
   determining an actual width value of the display unit; and
   determining the first separation value based on the actual width value, the virtual width value and the second separation value.

5. The method of claim 1, wherein said obtaining the second separation value of the first target object using the first virtual camera and the second virtual camera comprises:
   determining a fourth distance value between the first target object and a first connection line in the first 3D model, the first connection line connecting the first virtual camera and the second virtual camera;
   determining a fifth distance value between the first virtual camera and the second virtual camera;
   determining a sixth distance value between a visual focus of the first virtual camera and the second virtual camera and the first connection line; and
   determining the second separation value based on the fourth distance value, the fifth distance value and the sixth distance value.

6. The method of claim 1, further comprising, subsequent to determining the second distance value between the first user and the first target object based on the user location information:
   obtaining a first operation performed by the first user;
   judging whether the first operation and the second distance value satisfy a predetermined relationship; and
   generating, in response to the first operation, a first control instruction corresponding to the first operation when the first operation and the second distance value satisfy the predetermined relationship.

7. The method of claim 6, wherein said judging whether the first operation and the second distance value satisfy the predetermined relationship comprises:
   determining a seventh distance value between a first operation area of the first operation and the first user; and
   judging whether an absolute difference between the seventh distance value and the second distance value is smaller than a predetermined distance threshold,
   wherein it is judged that the first operation and the second distance value satisfy the predetermined relationship when the absolute difference is smaller than the predetermined distance threshold.

8. An electronic device comprising or being connected to a display unit, the electronic device comprising:
   a first obtaining module configured to obtain a first target object containing a first display image and a second display image different from the first display image;
   a displaying module configured to display the first display image based on a first display parameter and display the second display image based on a second display parameter different from the first display parameter, such that a first user using the electronic device perceives a first distance value larger than zero, the first distance value indicating a distance between a plane where a display position of the first target object is located and a plane where the display unit is located;

a detecting module configured to detect user location information corresponding to the first user;

a determining module configured to determine a second distance value between the first user and the first target object based on the user location information;

an obtaining module configured to obtain a first three-dimensional (3D) model which is a 3D model of the first target object perceived by a first virtual camera and a second virtual camera that simulate the eyes of the first user, before the determining module determines the first separation value between the first display image and the second display image on the display unit:

a second acquiring module configured to acquire a virtual width value of the display unit using the first virtual camera and the second virtual camera; and a third acquiring module configured to acquire a second separation value of the first target object using the first virtual camera and the second virtual camera.

9. The electronic device of claim 8, wherein the detecting module is configured to:

detect, as the user location information, a third distance value between eyes of the first user and the plane where the display unit is located.

10. The electronic device of claim 9, wherein the determining module comprises:

a first determining unit configured to determine a first separation value between the first display image and the second display image on the display unit;

a detecting unit configured to detect a pupillary distance value of the first user; and a second determining unit configured to determine the second distance value based on the third distance value, the first separation value and the pupillary distance value.

11. The electronic device of claim 8, wherein the first determining unit comprises:

a first determining sub-unit configured to determine an actual width value of the display unit; and a second determining sub-unit configured to determine the first separation value based on the actual width value, the virtual width value and the second separation value.

12. The electronic device of claim 8, wherein the third acquiring module comprises:

a third determining unit configured to determine a fourth distance value between the first target object and a first connection line in the first 3D model, the first connection line connecting the first virtual camera and the second virtual camera;

a fourth determining unit configured to determine a fifth distance value between the first virtual camera and the second virtual camera;

a fifth determining unit configured to determine a sixth distance value between a visual focus of the first virtual camera and the second virtual camera and the first connection line; and a sixth determining unit configured to determine the second separation value based on the fourth distance value, the fifth distance value and the sixth distance value.

13. The electronic device of claim 8, further comprising:

a capturing module configured to obtain a first operation performed by the first user, after determining the second distance value between the first user and the first target object based on the user location information;

a judging module configured to judge whether the first operation and the second distance value satisfy a predetermined relationship; and a responding module configured to generate, in response to the first operation, a first control instruction corresponding to the first operation when the first operation and the second distance value satisfy the predetermined relationship.

14. The electronic device of claim 13, wherein the judging module comprises:

a seventh determining unit configured to determine a seventh distance value between a first operation area of the first operation and the first user; and a judging unit configured to judge whether an absolute difference between the seventh distance value and the second distance value is smaller than a predetermined distance threshold, wherein it is judged that the first operation and the second distance value satisfy the predetermined relationship when the absolute difference is smaller than the predetermined distance threshold.

* * * * *